United States Patent [19]

Taylor

[11] 3,754,317
[45] Aug. 28, 1973

[54] LONGITUDINAL MULTI-ELASTOMER RESILIENT BUSHING

[76] Inventor: John E. M. Taylor, 27900 Fairmount Blvd., Pepper Pike, Ohio 44124

[22] Filed: July 24, 1970

[21] Appl. No.: 58,113

[52] U.S. Cl............ 29/451, 29/455, 29/460, 64/11 R, 264/262, 287/85
[51] Int. Cl............................................. B23p 11/02
[58] Field of Search..................... 29/451, 450, 455, 29/460; 264/262; 287/85; 64/11 R, 27 NM

[56] References Cited
UNITED STATES PATENTS

| | | | |
|---|---|---|---|
| 2,468,311 | 4/1949 | Gratenhuis | 29/451 UX |
| 2,689,755 | 9/1954 | Kratz | 264/262 X |
| 2,845,657 | 8/1958 | Beare | 264/262 X |
| 2,864,130 | 12/1958 | Beare | 264/262 X |
| 2,895,175 | 7/1959 | Reuter et al. | 264 262 |
| 3,071,851 | 1/1963 | Haushalter | 29/451 |
| 3,127,673 | 4/1964 | Caunt | 29/450 |
| 3,137,148 | 6/1964 | Kayser | 29/450 UX |
| 2,468,985 | 5/1949 | Kratz | 64/11 R UX |

*Primary Examiner*—Charlie T. Moon
*Attorney*—Alfred C. Body

[57] ABSTRACT

Forcible assembly of a short elastomeric insert concentrically between an inner and an outer rigid cylinder and subsequent casting or pressing in place of — additional longitudinally arrayed elastomers of selected physical properties so as to fill remaining annular spaces after emplacement of small, highly-compressible, deformation-control elastomers, the entire assembly providing an economical, long-life, resilient bushing.

21 Claims, 6 Drawing Figures

Patented Aug. 28, 1973　　　　　　　　　　　　　　　3,754,317
3 Sheets-Sheet 1
FIG. 1
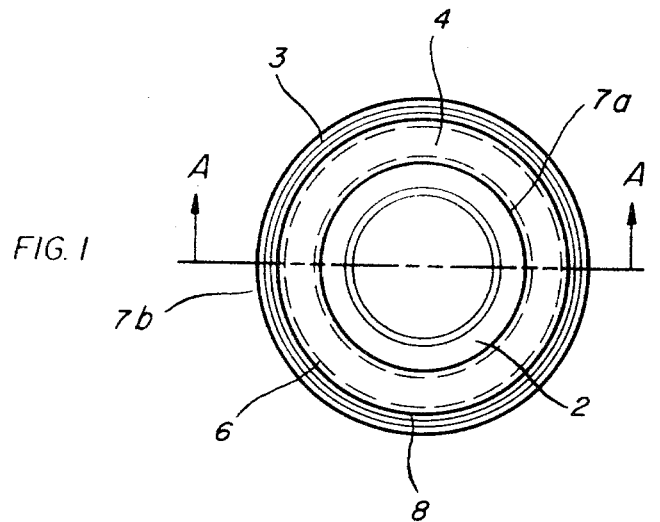
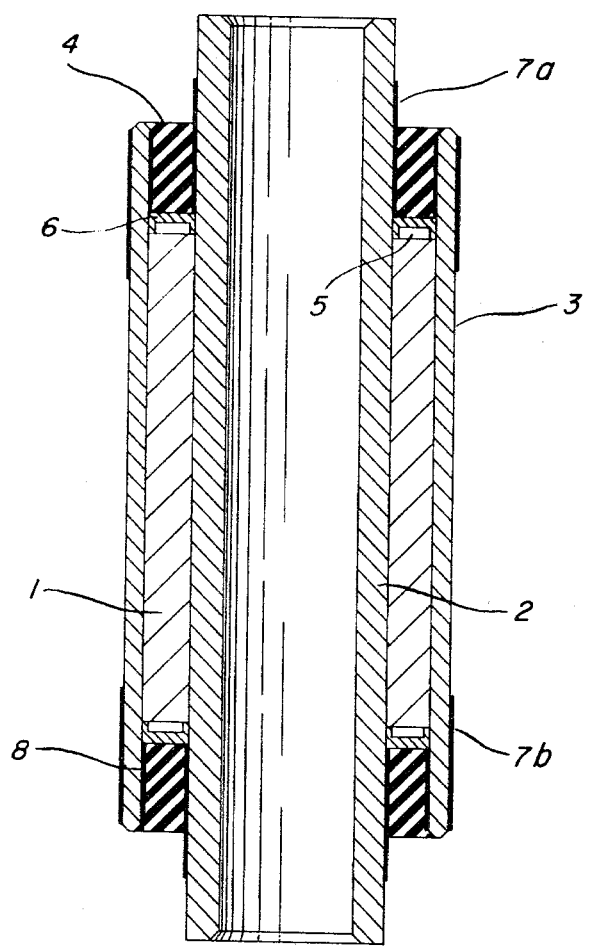
FIG. 1A

LONGITUDINAL MULTI-ELASTOMER RESILIENT BUSHING

BACKGROUND OF THE INVENTION

This invention is in the field of method of assembly of bushings in such a manner and configuration that service life is significantly increased and assembly reject rates are substantially reduced.

It has become a well-established custom in recent years to use resilient bushings of the general type described herein in a wide variety of applications including torsional joints, pivotal connections, vibration and sound absorbing mountings, and isolators. Typically the construction of such a bushing consists of concentric tubular sleeves, preferably metal, separated by a resilient elastomeric insert, which insert permits relative rotational, radial or axial movement between said two sleeves.

During the assembly process the resilient annulus has a strong tendency to roll or expand unevenly with the result that adjustment is required or an inferior joint is produced. Many bushings require removal of excess insert material by knife or lathe.

In these bushings the elastomeric insert is held in radial compression between the tubular metal sleeves, the force of compression serving to resist slippage between the insert and the sleeves and to increase the radial load sustaining characteristics of the bushing. Such a bushing performs satisfactorily so long as operational conditions are not particularly severe and are limited to radial deflection. However, the compressive forces between the insert and the sleeves are not sufficient to prevent slipping when the bushing is subjected to large torsional or axial deflection.

To alleviate this problem, it has been attempted to assemble bushings utilizing an uncured elastomeric insert which is compressibly restrained between the outer and inner metal sleeves after which the bushing is heated to vulcanize the insert and to bond it to said sleeves. Unfortunately, however, vulcanizing the insert in situ tends to at least partially relieve the compressive forces within the insert, thereby negating some of the advantages provided by compressibly restraining the insert.

More recently, bushings have been assembled utilizing an adhesive to bond a compressed cured elastomeric insert to the contacting faces of the metal sleeves. Because of the failure to utilize the optimum properties of the adhesive in this type of bushing, bonding failures are common and this design has not found commercial acceptance.

Many other variations of design and assembly method have been disclosed during the several decades these bushings have been under continuous development and use, generally seeking to improve performance and/or lower cost of manufacture.

CROSS-REFERENCE TO RELATED PATENTS

The prior art contains a number of patents for resilient bushings of this class. These patents show a wide range of individual design features and assembly methods. Although a large variety of concepts have been developed, few have proved commerically viable. Reference is made to the following pertinent U.S. Pat. Nos.:

2,004,712 Thiry June 11, 1935
2,457,647 Dodge Dec. 28, 1948
2,492,227 Korecki Dec. 27, 1949
2,660,780 Beck Dec. 1, 1953
3,387,839 Miller June 11, 1968

BRIEF SUMMARY OF THE INVENTION

The larger resilient bushings of this class are in daily use in trucks and vehicles around the world. These bushings, used in vehicle suspension systems, commonly have a beam center bushing and two beam end bushings.

A typical beam center bushing design is comprised of a rigid inner cylinder, a shorter, rigid outer cylinder and an elastomeric insert which is assembled between the two rigid cylinders, with the use of substantial force. The resilient insert is most commonly designed to almost exactly fill the annular volume between the rigid cylinders. The initial height and thickness of the resilient insert are designed so that during the forcible assembly the insert comes under radial compression of about 2 to 1 and this causes a proportional longitudinal elongation. After assembly, the insert almost exactly fills the annulus between the rigid cylinders. After cleaning and ageing, the bushings are ready for use.

Once placed in service on typical heavy duty equipment, these bushings are often subjected to high stress. The severity of operating conditions can cause high conical and torsional deflection of the metal cylinders with respect to each other. This can cause undue deformation in the resilient insert with consequent temperature rise and acceleration of wear. In addition, extreme conical deflection has been observed to cause cutting of the extended resilient insert by the edge of the outer rigid cylinder. These severe conditions can occur under commonly experienced field conditions and result in premature failure of the beam center bushing.

This invention is conceived to substantially reduce the onset of failure of these beam center bushings by a novel assembly procedure whereby the design length of the first elastomer insert is reduced and in the resulting annular void between the inner rigid cylinder and the outer rigid cylinder at each end, new materials are introduced. The foreshortened elastomer insert is assembled between the rigid cylinders by methods well known in the art, and then additional elastomers, of carefully selected different properties, are assembled in each of the annular end cavities, which remain between the concentric rigid cylinders, as a result of the reduced volume of the first elastomer insert. The second and subsequent elastomer may be added to each end annular cavity by several processes, including pouring in a liquid elastomer after suitable preparation or by pressing in a prepared powder, each operation requiring different operations to complete these novel steps of the assembly process.

For example, the poured or potted elastomer method may require prior installation of a flexible spacer which may be desirable to provide a working cavity for the first elastomer to operate in so that it may alternately elongate and contract under load shocks without forcing the poured elastomer out of the annulus; the flexible spacer may also provide a means to prevent the poured elastomer from bonding to the inner or the outer containing wall of the annular volume, this in some cases being desirable to permit torsional rotation of the second elastomer under extreme loads and thus avoid mechanical breakdown of the poured elastomer. An anti-bond compound may alternatively be applied to either surface but this may be difficult to apply accurately and may inhibit bonding if desired on one of the annular surfaces.

As an example of the powdered elastomer assembly method, it is apparent that the process of installing rigid spacer(s), filling the annulus with powder, pressing, and subsequent curing would be time consuming, however, certain valuable properties may be inherent to this method.

One property of both the poured liquid second elastomer method and the pressed powder second elastomer method of assembly, which may be of substantial value is that these two methods permit the application of super strong filaments during the assembly process and such composite structures of elastomeric matrix and extreme modulus filaments have been widely introduced to applications where flexibility and high strength are desirable.

A substantial range of materials can be used to manufacture the various parts of these bushings. The rigid cylinders most commonly are steel to which a zinc phosphate coating is applied; the first elastomer may be a natural or synthetic rubber, a typical formulation being:

| | |
|---|---|
| Ribbed smoked sheet No.1 | 100.00 |
| Marbon 8000 A | 15.00 |
| ISAF Black | 23.00 |
| FF Black | 23.00 |
| Hysil | 9.00 |
| NOBS No. 1 | 1.10 |
| Bismate | .20 |
| Thermoflex A | 2.00 |
| Flexzone 3C | 1.25 |
| Stearic Acid | 1.25 |
| Zinc Oxide | 5.00 |
| Retarder PD | .75 |
| TP-70 | 2.00 |
| Sulfur | 2.50 |
| Total | 186.05 |
| | |
| Durometer | 80–83 |
| RH % | 61.70 |
| S/R | 2.17 |
| Nobs 1/R | 0.96 |
| Bismate/R | 0.174 |
| Tensile | 3300 |
| Sp.Gr. | 1.16 |

A typical spacer material is a thin flexible thermoplastic molding such as polyethylene or a foamed rubber of high compressibility with the pore structure arranged to prevent substantial penetration of the poured elastomer.

A typical second elastomer would be a pourable casting resin which when properly mixed with its curing agent and cured at 180°F for 3 hours will have the following approximate properties:

| | |
|---|---|
| Specific gravity | 1. to 1.5 |
| Tensile | 2000 to 3000 psi |
| Elongation | 250–400% |
| Ring Shore A Durometer | 80–100 |

An anti-bond coating material typically is a dilute silicone-water emulsion solution.

A bond promoting coating material can be one of many available commercial metal to elastomer bonding adhesives.

It will be apparent that many other materials may be utilized as substitutions for each of the preferred embodiments enumerated immediately above.

This summary will now be described in explicit detail for three design variations in the following three drawings. It will be apparent that many other variations of lengths of second and subsequent elastomers, detail of spacer designs, spacer locations, location or absence of bond surfaces, location or absence of anti-bond surfaces, size and shape of air gaps, as well as variations of both rigid and elastomeric material properties can be introduced within the scope of this invention. It will also be apparent that these assembly methods can be used on bushings other than beam center bushings.

BRIEF DESCRIPTION OF THE DRAWINGS

FIG. 1 is an end view of a beam center bushing assembly utilizing a flexible metal or plastic spacer and a poured second elastomer;

FIG. 1A is a section view taken along line A—A of FIG. 1;

DETAILED DESCRIPTION

Figures 2, 2A:
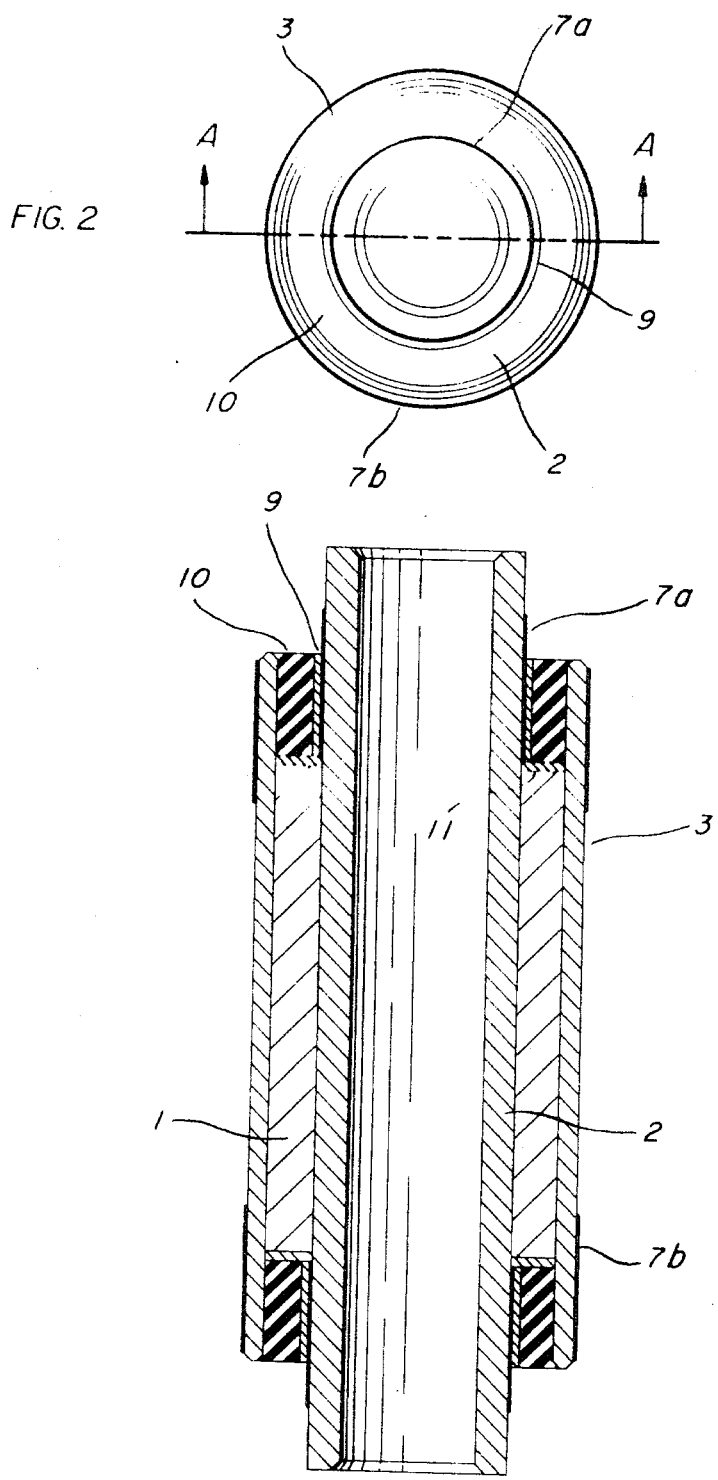
FIG. 2 is an end view of a beam center bushing assembly which incorporates a porous or foamed third elastomeric material to provide both a longitudinal and radial working volume to accommodate elongations in the first, mechanically assembled elastomer and the second, poured elastomer, respectively.
FIG. 2A is a section view taken along line A—A of FIG. 2.

The three figures which are now described in full detail were chosen to give the preferred embodiments of this invention which utilizes a poured or injected liquid second elastomer assembly method. Use of a powdered second elastomer in the assembly instead of the poured second elastomer would comprise operations similar to those to be described for the poured elastomer method, except the powdered method would require pressing and a different cure cycle. The solid or pre-cured second elastomer assembly method requires only slipping a pre-cured second elastomer of suitable dimensions over the inner rigid cylinder and down into the cavity so as to allow an air gap to remain between the first elastomer 1 and the second elastomer and between the second elastomer and the outer or the inner wall of the annulus.

Referring to FIGS. 1 and 1A, reference numeral 1 is a rubber-like first elastomer which is compressed into an outer rigid cylinder 3, using tooling and lubrication well known in the art, and this sub-assembly 1+3 is forcibly driven down over the inner rigid cylinder 2, using machinery, tooling and lubrication well known in the art. At this point in the assembly process, it is often convenient to use a properly diemensioned set of four tubes in an arbor press to accurately, longitudinally position the components of the 3-piece sub-assembly 1+2+3 with respect to each other according to engineering requirements. Sub-assembly 1+2+3 is then washed in hot alkali solution and dried. A pre-molded flexible spacer ring 6 is inserted in each of the two annular end cavities with orientation such that the extensions rest on the ends of the first elastomer 1.

As an optional step in the process, the outer walls of the rigid inner cylinders 2 and 3 may be coated with an anti-bond solution 7a and 7b, using brush or spray and shielding the inner end surface of the outer cylinder 3, which may optionally be coated with a bond promoting point 8.

The second elastomer 4, which is typically a two-component liquid, is mixed and poured in one end to the desired height, wiped free of excess liquid and allowed to solidify. This pouring step is then repeated in the other end of the assembly. In some cases, the properties are improved and/or the cure time is shortened by oven curing of elastomer 4.

Another preferred embodiment of this invention is shown in FIGS. 2 and 2A, wherein components 1, 2, and 3 are identical with those parts of the same reference number described in FIGS. 1 and 1A, and are jointly assembled in the same manner as above described.

An anti-bond paint 7a may optionally be applied to the outer surface of the inner cylinder 2 and the same paint 7b may be optionally applied to the outer surface of the outer cylinder 3. This step is primarily a matter of convenience in this assembly method and may be omitted. As in FIG. 1, an option bonding adhesive may be applied to the inner annular surface of outer cylinder 3.

A porous, highly compressible foamed elastomer, preferably with non-interconnecting pores, is molded or cut from sheet to form a longitudinal ring spacer 11 which is placed in loose contact with each end of the first elastomer. The same foamed elastomer in tubular form or cemented flat sheet is employed to form a radial sleeve spacer 9 which is slipped over each end of inner cylinder 2 and down and in contact with the inner cylinder 2, using anti-bond agent 7a as an optional lubricant. As a variation, tubular solid pre-cured elastomer can optionally be used for spacer 9.

A second elastomer 10 is mixed and poured into one end annular cavity to the selected depth. After elastomer 10 has solidifed, the assembly is inverted and the other end cavity is poured with elastomer 10. Oven cure or air cure may be selected.

Figures 3, 3A:
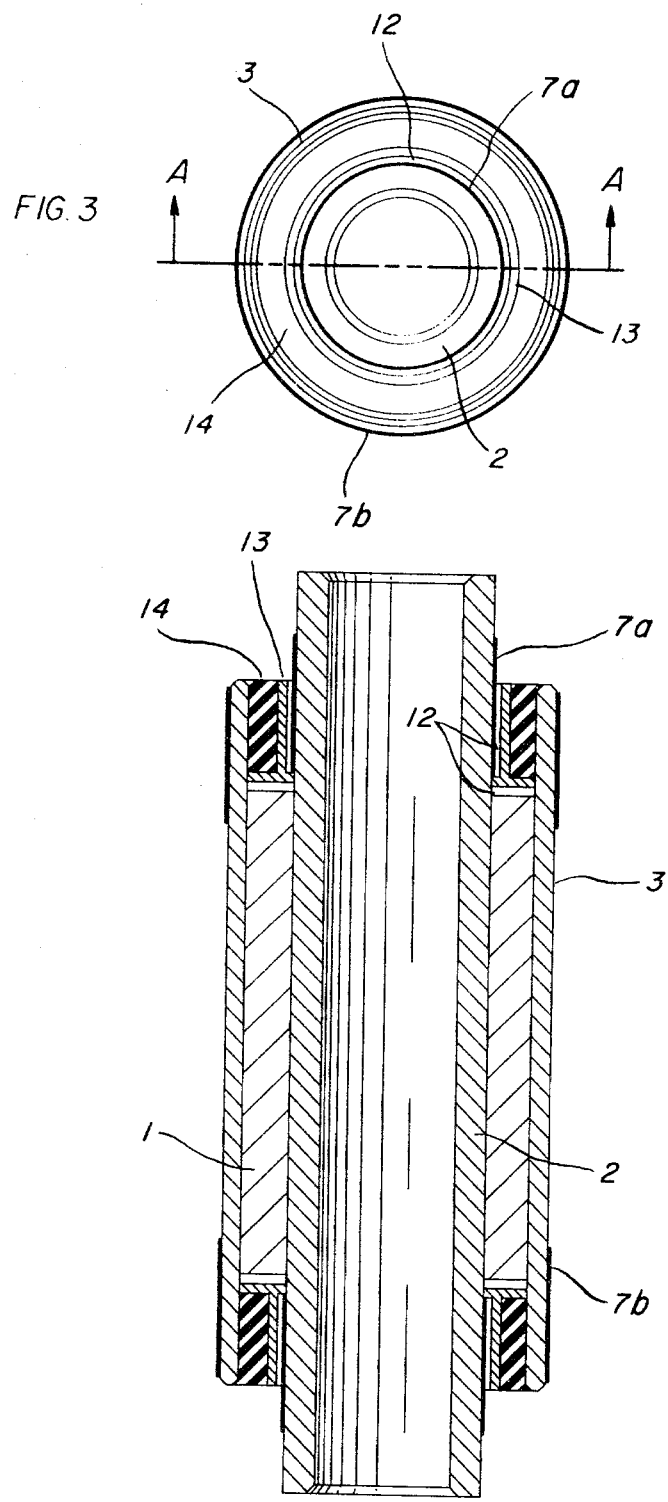
FIG. 3 is an end view of a beam center bushing which incorporates a flexible spacer so as to provide an air gap both longitudinally between the first and second elastomers and also between the second elastomer and the inner metal wall.
FIG. 3A is a section view taken along line A—A of FIG. 3.

A third example, chosen from many possible configurations, is described in FIGS. 3 and 3A. Components 1, 2, and 3 are again identical with those parts of the same reference number described in FIG. 1 and are assembled as previously described. A pre-molded flexible spacer 13, designed to provide longitudinal and radial air gaps 12, is inserted into each annular end cavity. Anti-bond paint is optionally applied to inner cylinder 2 at 7a and outer cylinder 3 at 7b. Properly mixed liquid second elastomer 14 is poured into the outer end cavity and allowed to solidify. The assembly is inverted and the pouring process is repeated. Oven cure or air cure may be selected.

While the foregoing description has dealt primarily with beam center bushings, it should be understood that the techniques involved are widely applicable to the assembly and manufacture of other resilient bushings. It should be understood that various modifications can be made to the described embodiments without departing from the scope of the present invention. For example, any number and order of longitudinally or radially arranged elastomers may be assembled.

From the foregoing it will be understood that the present invention provides a means for assembling a resilient bushing which may substantially increase the field service endurance life and may improve ease of consistent assembly without undue scrap rejection rates, which can be experienced in actual manufacture.

I claim as my invention:

1. A method of assembling a resilient bushing of the type comprising first and second substantially concentric rigid sleeves having an elastomer disposed in the annular space therebetween, comprising the steps of:

introducing a solid elastomer member between the annular space-containing walls and forcing said member into a radially compressed and longitudinally expanded condition between said containing walls while leaving an annular cavity between said containing walls at both ends of said member, placing a highly compressible, impermeable elastomeric ring spacer in each of said cavities adjacent each end of said member, placing a tubular radial spacer in each of said cavities adjacent a containing wall, pouring a liquid elastomer into the remainder of each of said cavities, and curing said liquid elastomer.

2. The method of claim 1 wherein said tubular spacer is placed adjacent the inner containing wall.

3. The method of claim 1 wherein said tubular spacer is placed adjacent the outer containing wall.

4. A method of assembling a resilient bushing of the type comprising first and second substantially concentric rigid sleeves having an elastomer disposed in the annular space therebetween, comprising the steps of:

introducing an elastomer member between the annular space-containing walls, leaving an annular cavity between said containing walls at both ends of said elastomeric member, and introducing a liquid elastomer different from said elastomeric member into said annular cavities and curing said liquid elastomer therein.

5. The method of claim 4, including leaving an air gap between said elastomeric member and said different elastomer.

6. The method of claim 4, including leaving an air gap between a containing wall and said different elastomer.

7. The method of claim 4 including introducing a ring spacer into said cavities adjacent the ends of said elastomeric member.

8. The method of claim 4 including introducing a tubular spacer adjacent the inner containing wall.

9. The method of claim 4 including introducing a tubular spacer adjacent the outer containing wall.

10. The method of claim 4 including forcing said elastomeric member into a radially compressed and longitudinally expanded condition between said containing walls.

11. The method of claim 4 wherein said elastomer is radially compressed in a ratio of about 2 to 1.

12. A method of assembling a resilient bushing of the type comprising first and second substantially concentric rigid sleeves having an elastomer disposed in the annular space therebetween, comprising the steps of:

introducing an elastomer member between the annular space-containing walls, leaving an annular cavity between said containing walls at both ends of said elastomeric member, and introducing a powder elastomer different from said elastomeric member into said annular cavities and compressing and curing said powder elastomer therein.

13. The method of claim 12, including leaving an air gap between said elastomeric member and said different elastomer.

14. The method of claim 12, including leaving an air gap between a containing wall and said different elastomer.

15. The method of claim 12 including introducing said different elastomer as a liquid into said cavities and curing it therein.

16. The method of claim 12 including introducing said different elastomer as a powder into said cavities and compressing and curing it therein.

17. The method of claim 12 including introducing a ring spacer into said cavities adjacent the ends of said elastomeric member.

18. The method of claim 12 including introducing a tubular spacer adjacent the inner containing wall.

19. The method of claim 12 including introducing a tubular spacer adjacent the outer containing wall.

20. The method of claim 12 including forcing said elastomeric member into a radially compressed and longitudinally expanded condition between said containing walls.

21. The method of claim 12 wherein said elastomer is radially compressed in a ratio of about 2 to 1.

* * * * *